Figure 1:
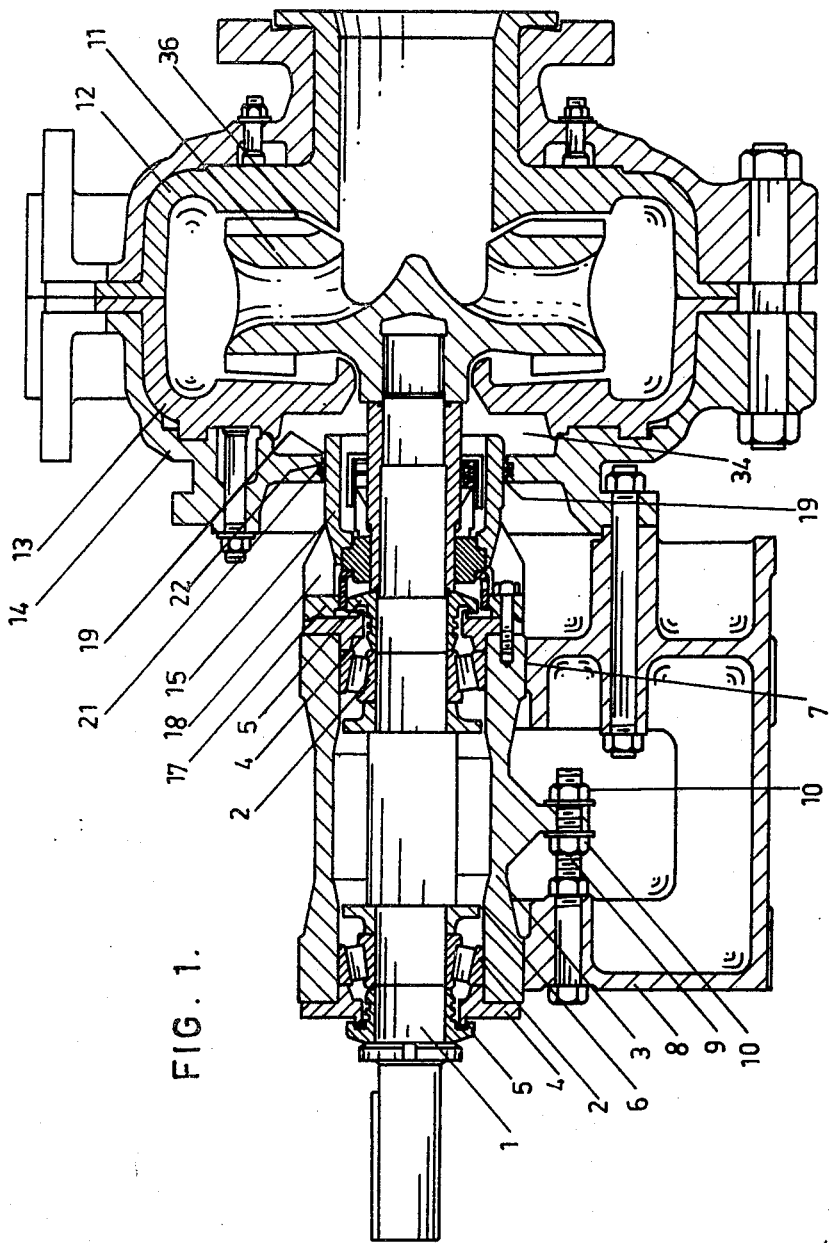

United States Patent [19]
Grzina

[11] 3,977,737
[45] Aug. 31, 1976

[54] SEAL ASSEMBLY FOR ROTATING SHAFT

[75] Inventor: Anthony Grzina, Artarmon, Australia

[73] Assignee: Warman International Limited, Artarmon, Australia

[22] Filed: June 17, 1975

[21] Appl. No.: 587,624

[30] Foreign Application Priority Data
June 20, 1974 Australia............................ 7915/74

[52] U.S. Cl................................. 308/36.2; 308/187
[51] Int. Cl.²...................... F01C 9/00; F01C 33/72; F16J 9/12
[58] Field of Search................. 308/36.2, 187, 187.1

[56] References Cited
UNITED STATES PATENTS

| | | | |
|---|---|---|---|
| 2,121,299 | 6/1938 | Peters | 308/36.2 |
| 2,707,135 | 4/1955 | Manahan | 308/36.2 |
| 2,978,264 | 4/1961 | Campbell | 308/36.2 |
| 3,208,803 | 9/1965 | Hennells et al. | 308/36.2 |
| 3,426,654 | 2/1969 | Laughman | 308/36.2 |
| 3,433,540 | 3/1969 | Schneider | 308/36.2 |
| 3,758,179 | 9/1973 | Smith | 308/36.2 |

Primary Examiner—M. H. Wood, Jr.
Assistant Examiner—Richard A. Bertsch
Attorney, Agent, or Firm—Haseltine, Lake & Waters

[57] ABSTRACT

A mechanical seal assembly for a rotating shaft passing into a pressure vessel and being axially adjustable is formed by a first seal face rotating with the shaft and engaging a fixed seal face. This latter face is supported in a housing which is axially adjusted with the shaft. The housing in turn passes through an opening in the pressure vessel and is permanently sealed therein by an O-ring seal.

4 Claims, 2 Drawing Figures

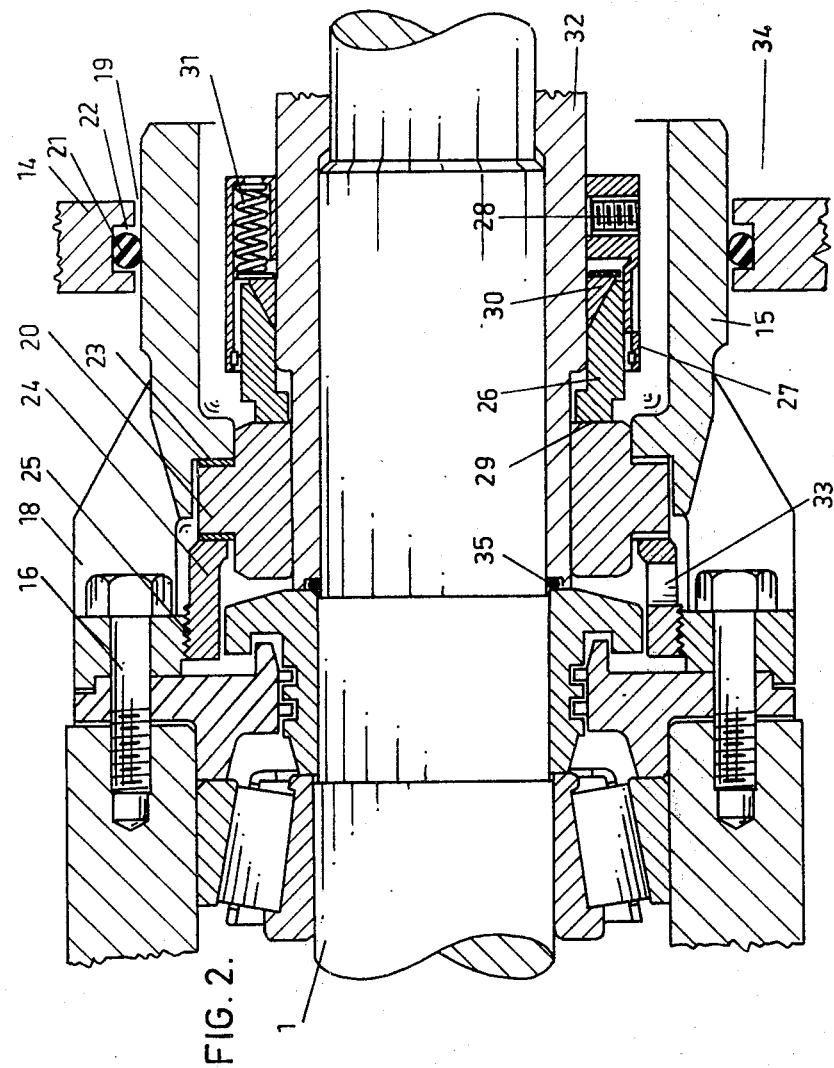

SEAL ASSEMBLY FOR ROTATING SHAFT

This invention relates to a mechanical seal assembly for a shaft passing through a wall of a pressure vessel.

There are many methods of sealing around rotating shafts; however, one method which is becoming widely employed is the use of arrangements generally described as mechanical seals or mechanical face seals. Such seals incorporate two main components, these being the actual seal members which each have a precision ground sealing face, the members being so arranged that the sealing faces bear on each other in such a manner as to prevent significant leakage of fluid across the faces and past the seal to or from the said pressure vessel.

One of the seal members is usually mounted in, fixed in relation to, and sealed against the wall of the pressure vessel and is referred to as the stationary seal face or seat.

The other seal member is attached to, sealed against and arranged to rotate with the rotating shaft. This member is referred to as the rotating seal face.

Sealing between the stationary seat and the wall of the pressure vessel, and between the rotating face and the shaft is effected successfully by known means. No relative rotational movement occurs during operation between the stationary seal member and the wall of the pressure vessel and between the rotating seal member and the shaft.

Various known means can be adopted to ensure correct contact pressure between the seal faces.

With all types of mechanical seals the relative location of the principal seal members and their associated mounting holders is critical and thus the setting and fixing of the rotating face on the shaft must be within close limits to allow satisfactory operation of the seal.

There are many cases where it is required to axially adjust the position of a rotating shaft passing through the wall of a pressure vessel. This applies for example to the impeller shaft of a centrifugal pump and is a particularly common requirement for centrifugal slurry pumps.

Axial adjustment of a shaft is difficult where the shaft is mechanically sealed due to one or more of the following reasons:
a. Any axial adjustment of the shaft requires relocation of the rotating seal components relative to the shaft in order to maintain their correct position relative to the stationary seal face.
b. Considerable dismantling of associated components may be necessary to gain access to reset seal components.
c. In some instances it is necessary to provide a step in the shaft where the rotating face is fitted in order to obtain the required pressure distribution across the seal components.

A considerable amount of work is, therefore, normally necessary to dismantle and reset the seal when the shaft is adjusted axially.

It is an object of this invention to provide means of mounting a mechanical seal assembly in such a manner that the shaft can be adjusted axially without disturbing the relative positions of the beforementioned seal faces.

In particular but not exclusively it is an object of this invention to provide such means applied to centrifugal pumps wherein the pressure vessel concerned is the pump casing and the rotating shaft is that on which the impeller is mounted. The invention is particularly advantageous in respect to slurry pumps wherein it is often required to adjust the impeller position by axial adjustment of the pump shaft. Wear of slurry pump components can require frequent repositioning of the impeller.

Pumps are in common use which have means to allow impeller adjustment without any prior dismantling of the pump or even draining of fluid therefrom. In one such design the pump shaft, to which the impeller is rigidly attached, is supported in, and axially located in a cartridge type bearing assembly which in turn is adjustably supported by and located in the pump base.

Means are provided to adjust axially the whole of the cartridge bearing assembly, the pump shaft, and the impeller as one unit, and to clamp the bearing assembly into the pump base, thus fixing the impeller in the desired axial position relative to the pump casing.

These known arrangements, however, do not achieve the above outlined objective with regard to the seal between the impeller shaft and the pump casing wall.

The above stated object is achieved, however, according to the invention by providing a housing supporting the stationary seal member of a mechanical seal assembly such that the housing is attached to and supported from the adjustable bearing assembly, and is arranged in such a manner that the housing passes through an opening in the wall of the pressure vessel and is adjustably sealed in that opening. With the stationary seal member mounted in the housing, it moves with the shaft when the shaft is axially adjusted. Therefore, with the rotating seal member set up correctly on the shaft, the two seal members move together with the shaft, maintaining their correct juxtaposition and requiring no separate adjustment or resetting.

The invention will be described in more detail hereinafter by way of an example in connection with the accompanying drawings showing schematically in FIG. 1 a section of a slurry pump incorporating a mechanical seal assembly with a stationary seal member mounted in a housing supported from an adjustable bearing assembly; and in FIG. 2 part of the seal assembly at an enlarged scale.

In FIG. 1 a shaft 1 is carried in bearings 2 supported in a cylindrical bearing housing 3 which together with end covers 4, labyrinth seals 5 and grease retainers 6 comprise a cartridge bearing assembly which is carried in semi-circular seats 7 in a pump base 8. The bearing assembly is so arranged that it can be moved axially in the base 8 by an adjusting screw 9 and locking nuts 10. Four clamping bolts are provided (not shown) to fix the bearing assembly in position when an impeller 11 has been adjusted to its required position relative to pump liners 12 and 13.

A pump casing 14 which contains and locates the liners 12 and 13 is spigotted and bolted to the base 8.

A seal housing 15 is supported from the bearing housing 3 and bolted to it by set screws 16 through a flange 17 of the seal housing. Ribs 18 connect the body of the seal housing to the flange 17. The seal housing 15 is arranged to pass through a cylindrical hole 19 in the pump casing 14.

The annular space between the seal housing 15 and the casing 14 is sealed by means of an O-ring 21 in a suitable groove 22. The groove is shown here in the pump casing 14 but could just as well be arranged in the seal housing 15. As there is no relative movement between the seal housing 15 and the pump casing 14 the O-ring provides a satisfactory static seal.

In FIG. 2 an enlarged view of the mounting of a mechanical seal is shown. A stationary seal member 20 is mounted in the seal housing 15 and is sealed against it by an elastometric seal 23. The seal member 20 is clamped into the seal housing 15 by means of a screwed clamping ring 24 which screws internally into a thread shown at 25 in the seal housing 15.

A rotating seal member 26 is mounted in a seal holder 27 which is fixed to a shaft sleeve 32 by grub screws 28 when it has been set on the shaft 1 in the correct position relative to a face 29 of the stationary seal member 20. An elastometric seal member 30 is arranged to prevent leakage between rotating seal member 26 and shaft sleeve 32.

Springs 31 are provided to keep the member 26 in correct contact with face 29 of member 20.

Holes 33 are provided in the clamping ring 24 for the purpose of rotating the latter and also to act as drain holes for any leakage which may occur between the seal faces at 29.

The arrangement according to the invention effectively prevents leakage between the inside 34 of the pump casing and the drain holes 33 and thus the atmosphere as follows - Leakage is prevented between the pump casing 14 and the seal housing 15 by means of the O-ring 21. Leakage is prevented between the rotating face 26 and the shaft sleeve 32 by seal member 30. Leakage is prevented past the seal faces 29 by the special inherent design of the mechanical seal components. Leakage is prevented between the stationary seal member 20 and the seal housing 15 by compression of the seal ring 23. Leakage along the shaft is prevented by additional shaft sleeve O-rings 35.

When it is required to axially adjust the impeller, for example, to reduce the clearance or compensate for wear at 36, then it is only necessary to loosen the bearing assembly clamp bolts (not shown); adjust the bearing assembly to the required position with the lock nuts 10 and retighten the clamp bolts. The shaft 1 must move with the bearing housing 3, and therefore the rotating seal member 26 must move with the bearing assembly also; because the stationary seal member 20 is also attached through the seal housing 15 to the bearing housing 3 it also moves; the seal members therefore move in unison when axial adjustment of shaft 1 is made and with no alteration to the face setting.

The foregoing detailed description refers to a particular exemplary slurry pump but the invention is equally applicable to other arrangements where seals are required for axially adjustable rotating shafts.

I claim:
1. A mechanical seal assembly for a rotating shaft having an axially adjustable bearing assembly and extending into a pressure vessel through an opening in the latter; the seal assembly comprising a first seal face on said shaft and being rotatable therewith; a stationary second seal face in a seal housing and cooperating with said first seal face; said housing being rigidly attached to said bearing assembly to pass through said opening in the pressure vessel; and sealing means in said opening to maintain a sealing relationship between said pressure vessel and said housing.

2. The mechanical seal assembly as defined in claim 1, wherein said seal faces are respectively mounted on said shaft and in said housing; the latter is axially adjustable with said bearing assembly; and said sealing relationship constitutes a permanent seal.

3. The mechanical seal assembly as defined in claim 1, wherein said second seal face is mounted in said housing to provide a permanent seal with respect to said first seal face, said housing is axially adjustable with said bearing assembly, and of substantially cylindrical shape, and said opening is substantially circular and has said sealing means supported thereby to maintain said sealing relationship between the pressure vessel and the housing.

4. The mechanical seal assembly as defined in claim 1, wherein said opening in the pressure vessel is substantially circular; said first seal face is mounted on said shaft; said housing is substantially clindrical and supports said second seal face; and wherein said circular opening has an annular groove in its inner surface, an O-ring positioned in said groove, and encircles said housing, to provide in said opening a permanent seal between said pressure vessel and said housing, constituted by said sealing relationship on axial adjustment of said bearing assembly.

* * * * *